(12) United States Patent
Shen et al.

(10) Patent No.: US 10,825,034 B2
(45) Date of Patent: Nov. 3, 2020

(54) SYSTEMS AND METHODS FOR DETERMINING CUSTOMER STATE TRANSITIONS FOR GROWTH OF CUSTOMER LIFETIME VALUES

(71) Applicant: WAL-MART STORES, INC., Bentonville, AR (US)

(72) Inventors: Wei Shen, Danville, CA (US); Tao Zhu, Millbrae, CA (US); Vahid Jalalibarsari, Sunnyvale, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 846 days.

(21) Appl. No.: 15/418,691

(22) Filed: Jan. 28, 2017

(65) Prior Publication Data

US 2018/0218383 A1 Aug. 2, 2018

(51) Int. Cl.
*G06Q 30/02* (2012.01)
*G06Q 10/06* (2012.01)

(52) U.S. Cl.
CPC ... *G06Q 30/0204* (2013.01); *G06Q 10/06315* (2013.01); *G06Q 30/0255* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 7,340,408 B1 | 3/2008 | Drew et al. | |
| 7,698,163 B2 | 4/2010 | Reed et al. | |
| 8,311,863 B1 * | 11/2012 | Kemp | G06Q 10/0639 705/7.11 |
| 2008/0147485 A1 * | 6/2008 | Osagami | G06Q 30/02 705/7.31 |
| 2012/0066065 A1 | 3/2012 | Switzer | |
| 2014/0180811 A1 * | 6/2014 | Boal | G06Q 30/0245 705/14.53 |
| 2016/0012465 A1 * | 1/2016 | Sharp | G06Q 20/18 705/14.17 |

OTHER PUBLICATIONS

Vanderveld, Ali, Pandey, Addhyan, Han, Angela, Parekh, Rajesh, "An Engagement-Based Customer Lifetime Value System for E-Commerce," KDD '16, Aug. 13-17, 2016, San Francisco, CA USA.

* cited by examiner

*Primary Examiner* — Thomas L Mansfield
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of determining a lifetime value (LTV) for customers of a retailer, segmenting the customers into customer states based upon one or more purchases made by each customer at the retailer within a predetermined period of time, determining a first average LTV for customers in a first customer state and a second average LTV for customers in a second customer state lower than the first average LTV, coordinating a first display of a first online advertisement for customers in the first LTV to transition the customers from the first customer state to the second customer state, and coordinating a second display of a second online advertisement for customers in the second state.

18 Claims, 7 Drawing Sheets

400

| 405 – Storing customer information in a customer database of a retailer. |

| 410 – Determining whether each customer of the plurality of customers had (1) an online store transaction with the retailer, (2) an offline store transaction with the retailer, and/or (3) an online interaction with the retailer within a first predetermined period of time. |

| 415 – Categorizing one or more first customers of the plurality of customers into a first customer group if the one or more first customers had (1) the online store transaction with the retailer, (2) the offline store transaction with the retailer, and/or (3) the online interaction with the retailer within the first predetermined period of time. |

| 420 – Categorizing one or more second customers of the plurality of customers into a second customer group if the one or more second customers did not have (1) the online store transaction with the retailer, (2) the offline store transaction with the retailer, and/or (3) the online interaction with the retailer within the first predetermined period of time. |

| 425 – Predicting, using a LTV update model, a LTV for each of the one or more first customers of the first customer group. |

| 430 – Predicting, using one or more LTV decay functions, the LTV for each of the one or more second customers of the second customer group. |

| 435 – Determining an online advertisement for each customer of the plurality of customers based on the LTV as predicted for each customer of the plurality of customers. |

| 440 – Coordinating a display of the online advertisement for at least a portion of the plurality of customers. |

426 – Predicting a retention probability for each of the one or more first customers using a logistic regression.

427 – Determining if the retention probability for each of the one or more first customers is greater than a predetermined threshold value.

428 – Predicting (1) a gross merchandise volume (GMV) value and (2) a number of orders for each of the one or more first customers using a random forest model if the retention probability for each of the one or more first customers is greater than the predetermined threshold.

429 – Predicting (1) a zero GMV value and (2) zero orders for any of the one or more first customers if the retention probability for the any of the one more first customers is not greater than the predetermined threshold.

505 – Determining, for each customer of a plurality of customers, a LTV for a retailer.

510 – Segmenting the plurality of customers into a plurality of customer states based upon one or more purchases made by each customer of the plurality of customers at the retailer within a predetermined period of time.

515 – Determining a first average LTV for the one or more first customers and a second average LTV for the one or more second customers.

520 – Coordinating a first display of a first online advertisement for the one or more first customers to transition the one or more first customers from the first customer state to the second customer state.

525 – Coordinating a second display of a second online advertisement for the one or more second customers.

FIG. 5

SYSTEMS AND METHODS FOR DETERMINING CUSTOMER STATE TRANSITIONS FOR GROWTH OF CUSTOMER LIFETIME VALUES

TECHNICAL FIELD

This disclosure relates generally to systems and methods for customer state transitions for growth of customer lifetime values.

BACKGROUND

A lifetime value (LTV) is used to predict a customer's future value with a company or retailer. Identification of overall LTV growth paths for all customers can be useful for overall growth of a retailer. Identifying incremental growth of an LTV for an individual customer, however, can be very difficult. Conventional systems and methods for identifying incremental growth of an LTV for an individual customer typically result in non-continuous functions, making estimation of derivatives very difficult.

BRIEF DESCRIPTION OF THE DRAWINGS

To facilitate further description of the embodiments, the following drawings are provided in which:

FIGS. 4A-B are flowcharts for a method, according to certain embodiments;

FIG. 5 is a flowchart for a method, according to additional embodiments;

Figure 1:
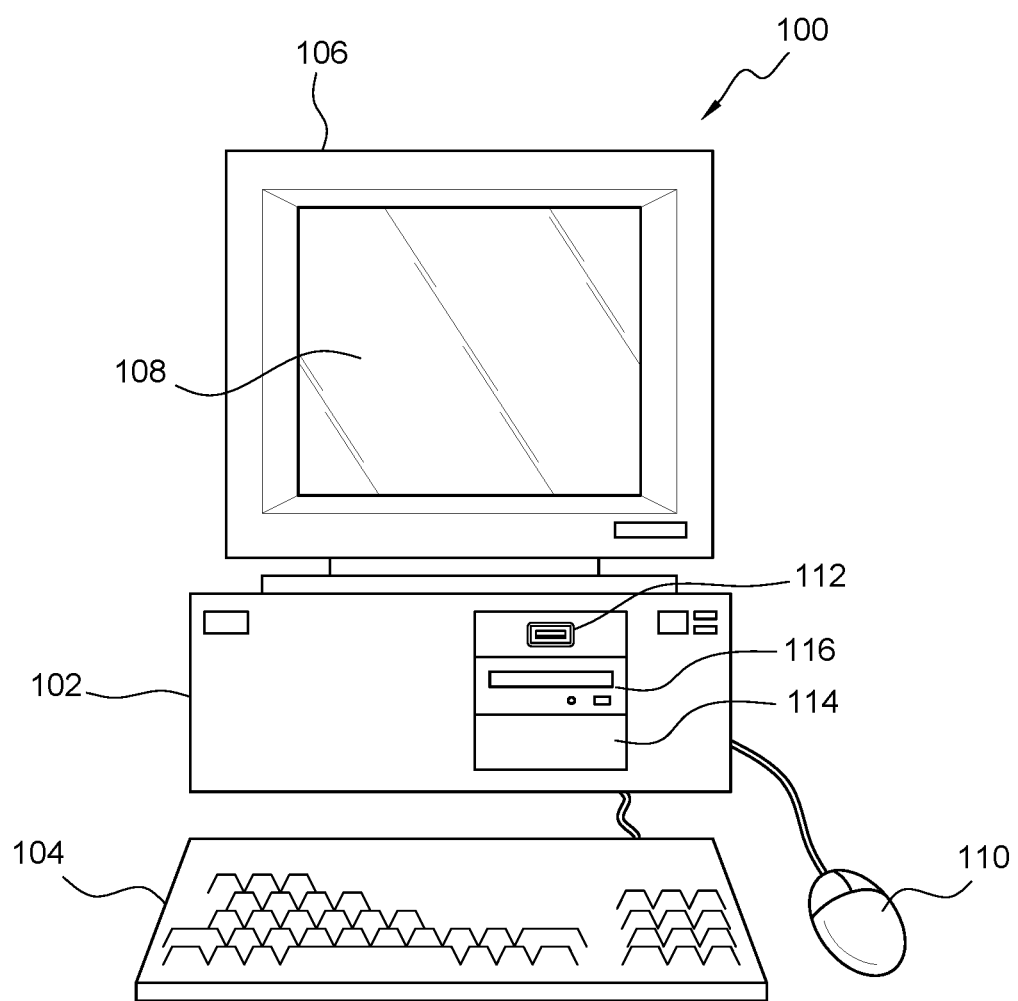
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of determining, for each customer of a plurality of customers, a LTV for a retailer. The one or more storage modules can be further configured to run on the one or more processing modules and perform an act of segmenting the plurality of customers into a plurality of customer states based upon one or more purchases made by each customer of the plurality of customers at the retailer within a predetermined period of time such that one or more first customers of the plurality of customers are segmented into a first customer state of the plurality of customer states and one or more second customers of the plurality of customers are segmented into a second customer state of the plurality of customer states. The one or more storage modules can be further configured to run on the one or more processing modules and perform an act of determining a first average LTV for the one or more first customers and a second average LTV for the one or more second customers, wherein the first average LTV is a lower number than the second LTV. The one or more storage modules can be further configured to run on the one or more processing modules and perform an act of coordinating a first display of a first online advertisement for the one or more first customers to transition the one or more first customers from the first customer state to the second customer state. The one or more storage modules can be further configured to run on the one or more processing modules and perform an act of coordinating a second display of a second online advertisement for the one or more second customers.

Various embodiments include a method. The method can include determining, for each customer of a plurality of customers, a LTV for a retailer. The method also can include segmenting the plurality of customers into a plurality of customer states based upon one or more purchases made by each customer of the plurality of customers at the retailer within a predetermined period of time such that one or more first customers of the plurality of customers are segmented into a first customer state of the plurality of customer states and one or more second customers of the plurality of customers are segmented into a second customer state of the plurality of customer states. The method also can include determining a first average LTV for the one or more first customers and a second average LTV for the one or more second customers, wherein the first average LTV is a lower number than the second LTV. The method also can include coordinating a first display of a first online advertisement for the one or more first customers to transition the one or more first customers from the first customer state to the second customer state. The method also can include coordinating a second display of a second online advertisement for the one or more second customers.

Figure 2:
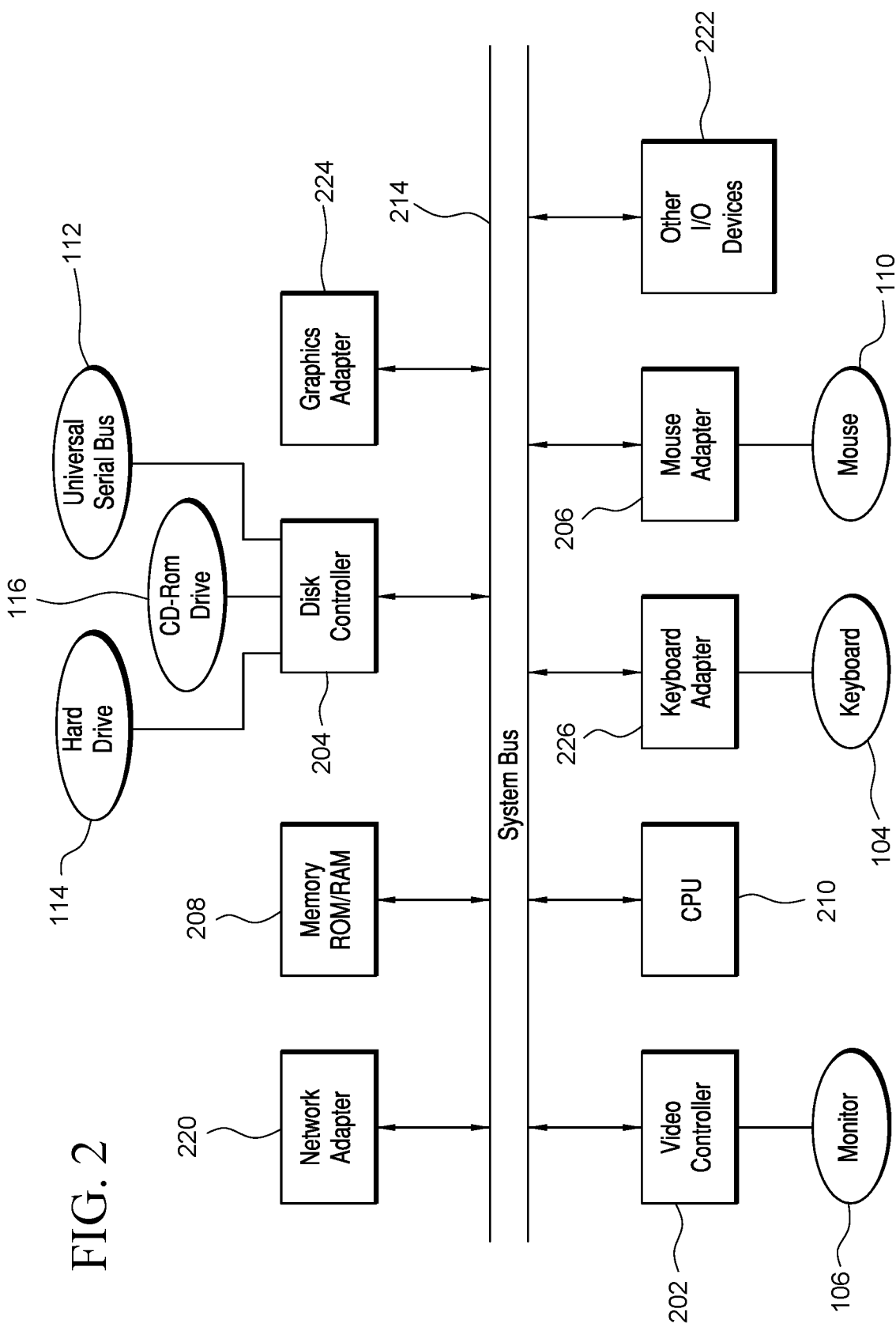
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
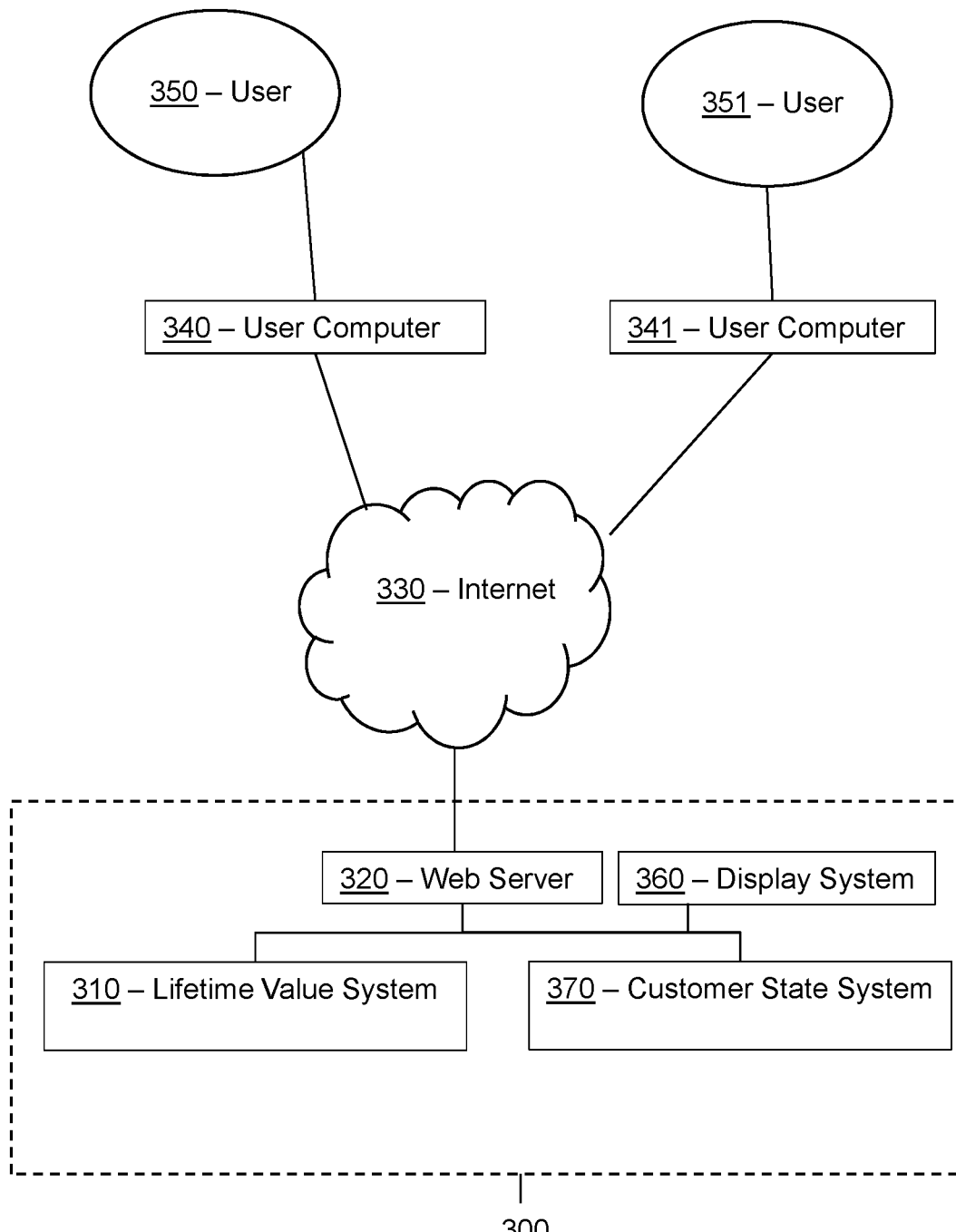
FIG. 3 illustrates a representative block diagram of a system, according to an embodiment.

Turning ahead in the drawings, FIG. 3 illustrates a block diagram of a system 300 that can be employed for determining customer LTV, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a LTV system 310, a web server 320, a display system 360, and/or a customer state system 370. LTV system 310, web server 320, display system 360, and/or customer state system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of LTV system 310, web server 320, display system 360, and/or customer state system 370. Additional details regarding LTV system 310, web server 320, display system 360, and/or customer state system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, LTV system 310, web server 320, display system 360, and/or customer state system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) LTV system 310, web server 320, display system 360, and/or customer state system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of LTV system 310, web server 320, display system 360, and/or customer state system 370. In a similar manner, the processing module(s) and the memory storage module(s) can be local and/or remote to each other.

In many embodiments, LTV system 310, web server 320, display system 360, and/or customer state system 370 can be configured to communicate with one or more user computers 340 and 341. In some embodiments, user computers 340 and 341 also can be referred to as customer computers. In some embodiments, LTV system 310, web server 320, display system 360, and/or customer state system 370 can communicate or interface (e.g., interact) with one or more customer computers (such as user computers 340 and 341) through a network or internet 330. Internet 330 can be an intranet that is not open to the public. Accordingly, in many embodiments, LTV system 310, web server 320, display system 360, and/or customer state system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, LTV system 310, web server 320, display system 360, and/or customer state system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between LTV system 310, web server 320, display system 360, and/or customer state system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 6:
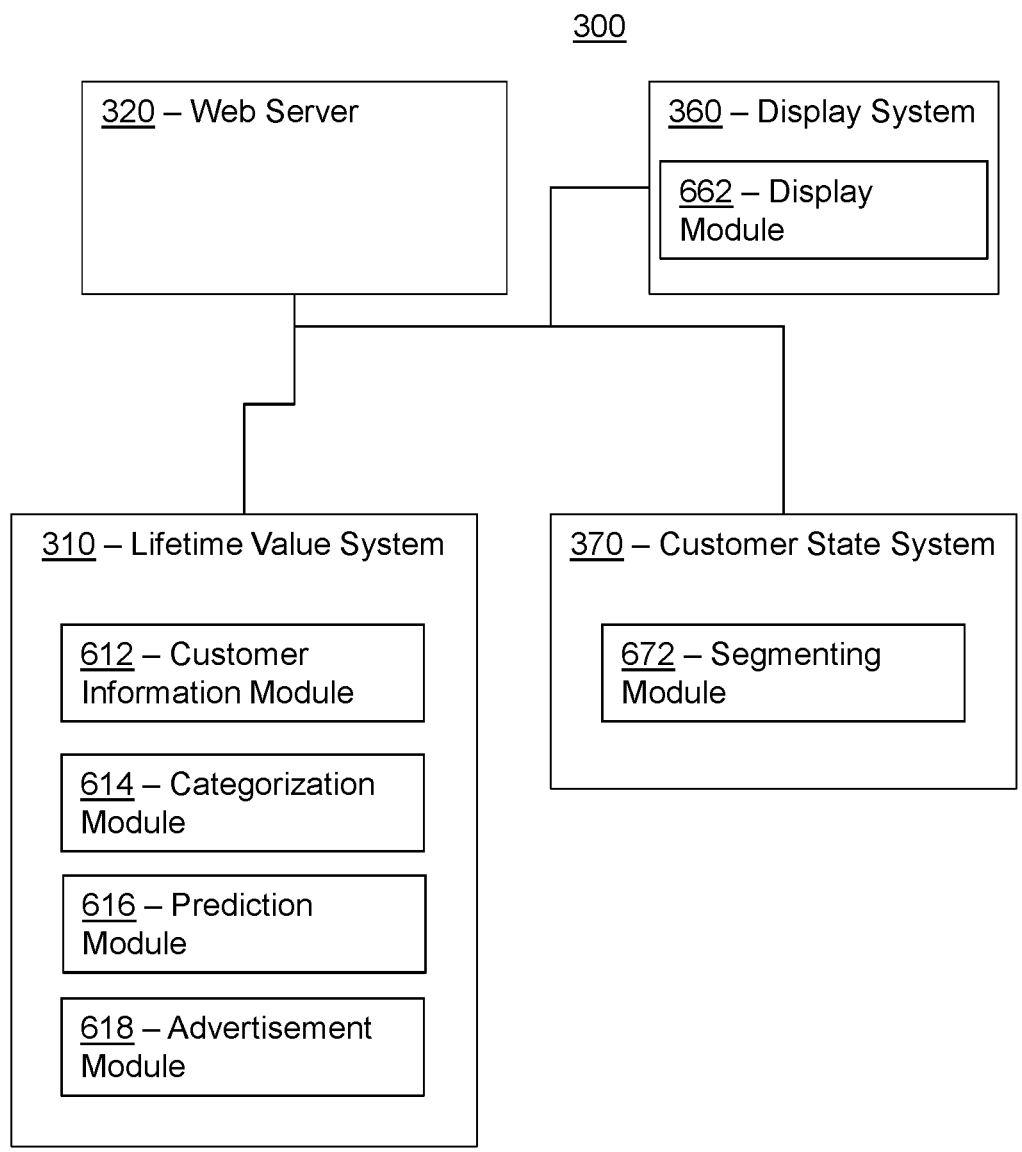
FIG. 6 illustrates a representative block diagram of a portion of the system of FIG. 3, according to an embodiment.

Turning ahead in the drawings, FIGS. 4A-B illustrate flowcharts for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 612, 614, 616, 618, 662 and/or 672 (FIG. 6). Such non-transitory memory storage modules can be part of a computer system such as LTV system 310, web server 320, display system 360, and/or customer state system 370 (FIGS. 3 & 6). The processing module(s) can be similar or identical to the processing module(s) described above with respect to computer system 100 (FIG. 1).

Certain embodiments of method 400 can comprise a two-stage machine learning LTV prediction framework that can be used for large-scale customer databases based on omni-channel interaction and transaction data. The LTV prediction framework described herein can be applied to both existing and potential customers. As described in greater detail below, omni-channel interaction and transaction data can comprise data from both online sources and offline sources. Generally, LTV for a customer can comprise long-term metrics that predict the customer's future value with a company. In certain embodiments, a LTV for a customer can be based on eighteen total indices, including three metrics, two aggregation levels, and three time windows. The three metrics can comprise a (1) gross merchandise volume (GMV) or revenue, (2) a number of orders made by the customer, and (3) a retention probability, or other metrics. The two aggregation levels can comprise consumable products, durable products, or other types of products. Consumable products can comprise products that consumers typically use recurrently and that can be used up, discarded, or can become expired. Durable products are products that do not wear out quickly, or that yield utility over time rather than being completely consumed in one use or a short period of time. In some embodiments, the LTV update models described below can be trained to apply to customers who have purchased only durable products, customers who have purchased only consumable products, and/or both durable and consumable products. The three time window can comprise 90 days, 180 days, 365 days, or other time periods.

Conventional methods and systems for determining LTVs for customers are based entirely on historical transactions for a customer. Embodiments of method 400 advantageously can take into account both online and offline transactions (or only one of online or offline transactions) for a customer, as well as other non-transactional interactions. These other non-transactional interactions can be helpful in determining a LTV for a customer because potential customers can sometimes make multiple visits to a website or store before purchasing an advertised product. LTVs for customers can be used in determining which advertisements of a plurality of advertisement will be most effective for a particular customer and/or most valuable to the retailer.

Turning to FIG. 4A, in some embodiments method 400 can comprise an activity 405 of storing customer information in a customer database of a retailer. The plurality of customers can comprise a plurality of preexisting customers and/or a plurality of potential customers. The customer information for each customer of the plurality of customers can comprise (1) demographic information, (2) online interaction information, and/or (3) transaction information comprising online store transaction information and offline store transaction information. Demographic information can comprise but is not limited to age, gender, income household size, location, and the like. Online interaction information can comprise but is not limited to a number of webpage views and/or searches in certain product categories in a past number of predetermined days that can be attributed to certain marketing channels. Other examples of online interactions can comprise visiting the website of a retailer via search engine marketing, registering for an account with the website of the retailer, receiving a marketing email from the retailer, clicking on an advertisement in an email from the retailer, shopping at a brick and mortar store of the retailer, and/or downloading a mobile application for the retailer. Transaction information can comprise but is not limited to a number of orders and/or GMV in certain product categories in a past number of predetermined days that can be attributed to certain marketing channels. All the transaction information and interaction information can be collected for all business channels, for example a desktop website for the retailer, a mobile website for the retailer, a mobile application for the retailer, and/or a brick and mortar store for the retailer (or offline store).

Continuing with FIG. 4A, method 400 further can comprise an activity 410 of determining whether each customer of the plurality of customers had (1) an online store transaction with the retailer, (2) an offline store transaction with the retailer, and/or (3) an online interaction with the retailer within a first predetermined period of time. The first predetermined period of time can comprise one day in some embodiments. In other embodiments, the first predetermined period of time can comprise between one and three days, between three days and six days, one week, or one month.

After determining whether each customer had a transaction or interaction with the retailer within a predetermined period of time, the plurality of customers can be divided or categorized into two groups: (1) customers that have had an interaction or transaction with the retailer within the predetermined period of time; and (2) customers that have not had an interaction or transaction with the retailer within the predetermined period of time. Thus, continuing with FIG. 4A, method 400 further can comprise an activity 415 of categorizing one or more first customers of the plurality of customers into a first customer group if the one or more first customers had (1) the online store transaction with the retailer, (2) the offline store transaction with the retailer, and/or (3) the online interaction with the retailer within the first predetermined period of time. Method 400 further can comprise an activity 420 of categorizing one or more second customers of the plurality of customers into a second customer group if the one or more second customers did not have (1) the online store transaction with the retailer, (2) the offline store transaction with the retailer, and/or (3) the online interaction with the retailer within the first predetermined period of time.

Customers that have had an interaction or transaction with the retailer within the predetermined period of time can have their LTV updated to reflect a new LTV using an LTV update model. As noted above, a LTV for a customer can be based on: (1) a predicted gross merchandise volume value; (2) a predicted number of orders; (3) a retention probability; (4) consumable products purchased; (5) durable products purchased; and/or (6) a predetermined window of time comprising one of 90 days, 180 days, or 365 days. Interactions and/or transaction by the customer with the online retailer can, therefore, affect a LTV for the customer. Thus, continuing with FIG. 4A, method 400 further can comprise an activity 425 of predicting, using a LTV update model, a LTV for each of the one or more first customers of the first customer group.

For customers who have made a purchase within the predetermined period of time, a two-stage approach can be utilized to estimate an updated LTV. Certain embodiments of the two-stage approach are beneficial to computer systems and networks because the two-stage approach described herein reduces an amount of time needed to determine or otherwise predict GMV and numbers of orders for a customer, thus allowing the computer system to operate more efficiently. A first stage of the two-stage approach can include predicting retention probability for the customer. Turning to FIG. 4B, in some embodiments activity 425 can comprise an activity 426 of predicting a retention probability for each of the one or more first customers using a logistic regression. In some embodiments, the predicted retention probability can be a binary determination of whether or not the customer will come back to the retailer.

Continuing with FIG. 4B, in some embodiments activity 425 also can comprise an activity 427 of determining if the retention probability for each of the one or more first customers is greater than a predetermined threshold value. In some embodiments, the predetermined threshold value can be between zero and one. By way of a non-limiting example, for a balanced set with retention percentage close to 50%, the predetermined threshold value can be approximately 0.5. After determining whether the retention probability for customers who have had an interaction or transaction with the retailer within the predetermined period of time is greater than a threshold value, those customers can be divided or categorized into two groups: (1) customers that have had an interaction and/or transaction with the retailer within the predetermined period of time and also have a retention probability that is greater than the threshold value;

and (2) customers that have had an interaction and/or transaction with the retailer within the predetermined period of time but do not have a retention probability that is greater than the threshold value.

For customers that have had an interaction and/or transaction with the retailer within the predetermined period of time and also have a retention probability that is greater than the threshold value, the second stage of the two-stage approach can be applied. For example, continuing with FIG. 4B, in some embodiments activity 425 further can comprise an activity 428 of predicting (1) a GMV value and (2) a number of orders for each of the one or more first customers using a random forest model if the retention probability for each of the one or more first customers is greater than the predetermined threshold.

For customers that have had an interaction and/or transaction with the retailer within the predetermined period of time but do not have a retention probability that is greater than the threshold value, the second stage of the two-stage approach is not applied and the predicted GMV and number of orders can be zero. For example, continuing with FIG. 4B, in some embodiments activity 425 additionally can comprise an activity 429 of predicting (1) a zero GMV value and (2) zero orders for any of the one or more first customers if the retention probability for the any of the one more first customers is not greater than the predetermined threshold.

In some embodiments, method 400 can optionally comprise an activity of updating the LTV update model at least once every three months. Updating the LTV update model can comprise (1) re-computing features and labels for the LTV update model utilizing the most recent available data and (2) re-calibrating parameters of the LTV update model. Updating the model LTV update model quarterly keeps the LTV update model fresh by using the most recent data to reflect any gradual changes in customer behavior. In certain embodiments, the LTV update model can comprise aggregated models of a first LTV update model trained from data within a second predetermined period of time and a second LTV update model trained from historical data for the second predetermined period of time. For example, the first LTV update model can be trained using data from the most recent month of December, and the second LTV update model can be trained using data from prior months to the most recent month of December.

Returning to FIG. 4A, customers that have not had an interaction or transaction with the retailer within the predetermined period of time are handled differently in the LTV prediction framework. The LTV of customers who did not place an order or have a transaction with the retailer can sometimes follow a smooth decay function with respect to a number of days since the last purchase or interaction. The decay pattern can be segmented and metric specific. Rather than applying the two-stage approach using the LTV update model to update the LTV, LTVs for customers that have not had an interaction or transaction with the retailer within the predetermined period of time are predicted using one or more LTV decay functions. For example, in some embodiments, method 400 additionally can comprise an activity 430 of predicting, using one or more LTV decay functions, the LTV for each of the one or more second customers of the second customer group. The decay functions are different from the two-stage approach of the LTV update model, and the LTV update model is not used for predicting LTV for the one or more second customers of the second customer group that have not had an interaction or transaction with the retailer within the predetermined period of time. In some embodiments, for example, predicting the LTV for each of the one or more second customers of the second customer group can comprise predicting the LTV for each of the one or more second customers of the second customer group using one or more piecewise linear functions to estimate a decay for LTV metrics for the one or more second customers. In some embodiments, the decay functions can be updated or re-calibrated quarterly.

Certain embodiments of the LTV prediction framework described herein are beneficial to computer systems and networks. Using a sophisticated LTV update model, such as described herein, to update LTVs for each and every customer in a database of a retailer can be a time and computer resource consuming activity that slows down the overall computer system and network. By using such a sophisticated model to updated LTVs for only those customers with transactions or interactions with the retailer within the predetermined amount of time, nearly all of the customers in the database of the retailer are typically eliminated from being updated using the sophisticated model. For example, less than 1% of LTVs may need to be updated using the sophisticated model if a system only updates LTVs using the sophisticated model for customers that have had an interaction and/or transaction with the retailer within the past day. Thus, according to certain embodiments, rather than updating the LTV using the sophisticated model for all the customers in the database of the retailer, which can include millions of customers, system 300 (FIG. 3) needs only to update the LTV using the sophisticated model for a very small percentage of customers, which frees up resources of system 300 for other computer network tasks. Moreover, in some embodiments a distributed network comprising distributed memory architecture is used to retrieve customer information and/or predict LTVs for the plurality of customers. This distributed architecture can reduce the impact on the network and system resources to reduce congestion in bottlenecks while still allowing data to be accessible from a central location.

Returning to FIG. 4A, in some embodiments method 400 further can comprise an activity 435 of determining an online advertisement for each customer of the plurality of customers based on the LTV as predicted for each customer of the plurality of customers. For example, certain advertisements can target certain customers based on the LTVs of the customers. Accordingly, continuing with FIG. 4A, in some embodiments, method 400 also can comprise an activity 440 of coordinating a display of the online advertisement for at least a portion of the plurality of customers.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 400 and/or one or more of the activities of method 500. In these or other embodiments, one or more of the activities of method 500 can be implemented as one or more computer instructions configured to run at one or more processing modules and configured to be stored at one or more non-transitory memory storage modules 612, 614, 616, 618, 662, and/or 672 (FIG. 6). Such non-transitory memory storage modules can be part of a computer system such as LTV system 310, web server 320, display system 360, and/or customer state system 370 (FIGS. 3 & 6). The processing module(s) can be similar or identical to the processing module(s) described above with respect to computer system 100 (FIG. 1).

In certain embodiments, customers can be defined in a plurality of customer states to characterize LTV growth path for the customers. Identification of LTV growth paths for customers can be useful for overall growth of a retailer. Once customers have been defined or categorized in one of a plurality of customer states, customers can be specifically targeted to transition from one customer state to another customer state with a higher LTV.

Identifying incremental growth of an LTV for an individual customer can be very difficult. For example, the incremental growth of an LTV for a customer i can be defined in a function $f$ as $LTV\_i = f(x\_i, y\_i, z\_i)$, where $x\_i$ are demographical features defining customer i, $y\_i$ are historical transaction features of customer i, and $z\_i$ are other interaction features of customer i. Identification of the incremental LTV growth for each customer is equivalent to taking a derivative of function $f$. In retail, however, a machine learning trained model typically does not have an explicit functional form. If the machine learning trained model does have an explicit function form, the results are typically non-continuous, making estimation of derivatives very difficult.

To solve this problem, customer states can be defined, and customers can be categorized or segmented into the customer states. Once segmented in a particular customer state, the customers can then be targeted within particular customer states to transition to other customer states comprising customers with higher average LTVs. Customer states can be useful in characterizing the future LTV status of customers, and the transition of a customer from one customer state to another customer state is interpretable. For example, the advancement of a customer from one customer state to another customer state with a higher average LTV can correspond to certain actions, such as the purchase of certain products with certain attributes. Moreover, the degradation of a customer from one customer state to another customer state with a lower average LTV can correspond to a lack of action by the customer. Various embodiments described herein are advantageous because the LTV growth path of customers can be modeled as the customers' transition from one customer state to another customer state. The LTV growth for customers also can be identified as a difference of average LTV between two adjacent customer states. Moreover, the transition of customers from one customer state to another customer state can easily be transformed into one or more marketing actions.

Various customer states can be defined according to different contemplated embodiments. For example, in one or more embodiments, the plurality of customer states can be defined as a prospect customer state, a new customer state, a repeat customer state, an inactive customer state, and an active customer state. Reference is made in certain embodiments to a predetermined period of time. The predetermined period of time can comprise a week, a month, three months, six months, one year, or two years in various embodiments based on the defined customer states. For example, in embodiments wherein the plurality of customer states are defined as a prospect customer state, a new customer state, a repeat customer state, an inactive customer state, and an active customer state, the predetermined period of time can comprise a year.

In some embodiments, a prospect customer state can be defined as a customer state wherein a customer has made no purchases with the retailer. That is, the customer can be considered a prospective customer. In some embodiments, a new customer state can be defined as a customer state where a customer has made only one purchase with the retailer within the predetermined period of time and no purchases with the retailer before the predetermined period of time. In some embodiments, a repeat customer state can be defined as a customer state where a customer has made two or more purchases with the retailer within the predetermined period of time, regardless of whether or not the customer has made any purchases with the retailer before the predetermined period of time. In some embodiments, an inactive customer state can be defined as a customer state where a customer has made no purchases with the retailer within the predetermined period of time and one or more purchases with the retailer before the predetermined period of time. In some embodiments, an active customer state can be defined as a customer state wherein a customer of the plurality of customer has made one purchase with the retailer within the predetermined period of time and one or more purchases with the retailer before the predetermined period of time.

By way of another non-limiting example, in one or more embodiments, customer states can be defined based on the purchase of certain products by the customer, such as but not limited to consumable products and/or durable products. For example, the plurality of customer states can be defined as a consumable prospect customer state, a new consumable customer state, a repeat consumable customer state, an inactive consumable customer state, and an active consumable customer state. Customers who purchase consumable products tend to have higher LTVs than customers who purchase only durable products. Thus, it is advantageous to transition customers to customer states that include the purchase of consumable products.

As noted above, reference is made in certain embodiments to a predetermined period of time. The predetermined period of time can comprise a week, a month, three months, six months, one year, or two years in various embodiments based on the defined customer states. For example, in embodiments where the plurality of customer states are defined as a consumable prospect customer state, a new consumable customer state, a repeat consumable customer state, an inactive consumable customer state, and an active consumable customer state, the predetermined period of time can comprise three months.

In some embodiments, a consumable prospect customer state can be defined as a customer state where a customer of the plurality of customers has made no consumable product purchases with the retailer. In some embodiments, a new consumable customer state where a customer of the plurality of customers has made one consumable product purchase with the retailer within the predetermined period of time and no consumable product purchases with the retailer before the predetermined period of time. In some embodiments, a repeat consumable customer state can be defined as a state where a customer of the plurality of customers has made two or more consumable product purchases with the retailer within the predetermined period of time, regardless of whether the customer has made any purchases with the retailer before the predetermined period of time. In some embodiments, an inactive consumable customer state can be defined as a customer state where a customer of the plurality of customers has made no consumable product purchases with the retailer within the predetermined period of time and one or more consumable product purchases with the retailer before the predetermined period of time. In some embodiments, an active consumable customer state can be defined as a customer state where a customer of the plurality of customer has made one consumable product purchase with the retailer within the predetermined period of time and one or more consumable product purchases with the retailer before the predetermined period of time.

In more particular embodiments, a consumable prospect state can be defined to include a plurality of customer sub-states. For example, in one or more embodiments a consumable prospect state can comprise a prospect customer state, a new consumable prospect customer state, a repeat consumable prospect customer state, an inactive consumable prospect customer state, and an active consumable prospect customer state. In each of these states, a customer may have purchased a durable product, but not a consumable product from the retailer.

In some embodiments, a prospect customer state can be defined as a customer state where a customer of the plurality customers has made no purchases with the retailer. In some embodiments, a new consumable prospect (or new durable) customer state can be defined as a customer state where a customer of the plurality of customers has made one durable product purchase with the retailer within the predetermined period of time and no durable product purchases with the retailer before the predetermined period of time. In some embodiments, a repeat consumable prospect (or repeat durable) customer state can be defined as a customer state where a customer of the plurality of customers has made two or more durable product purchases with the retailer within the predetermined period of time, regardless of whether or not the customer has made any purchases with the retailer before the predetermined period of time. In some embodiments, an inactive consumable prospect (or inactive durable) customer state can be defined as a customer state where a customer of the plurality of customers has made no durable product purchases with the retailer within the predetermined period of time and one or more durable product purchases with the retailer before the predetermined period of time. In some embodiments, an active consumable prospect (or active durable) customer state can be defined as a customer state where a customer of the plurality of customer has made one durable product purchase with the retailer within the predetermined period of time and one or more durable product purchases with the retailer before the predetermined period of time.

Turning to FIG. 5, method 500 can comprise an activity 505 of determining, for each customer of a plurality of customers, a LTV for a retailer. Determining the LTV for each customer can comprise any of the activities described above in relation to FIGS. 4A and 4B.

Method 500 further can comprise an activity 510 of segmenting the plurality of customers into a plurality of customer states based upon one or more purchases made by each customer of the plurality of customers at the retailer within a predetermined period of time. For example, one or more first customers of the plurality of customers can be segmented into a first customer state of the plurality of customer states as described above, and one or more second customers of the plurality of customers can be segmented into a second customer state of the plurality of customer states, as described above. The purchases could be online purchases only, in-store purchases only, or both online and in-store purchases.

Once segmented into the plurality of customer states, the average LTV for all of the customers segmented into each category can be determined. For example, method 500 further can comprise an activity 515 of determining a first average LTV for the one or more first customers and a second average LTV for the one or more second customers. The average LTV for customers segmented in certain categories can be higher than the average LTV for customer segmented in other categories. For example, the average LTV for customers segmented into a repeat consumable prospect customer state can be higher than the average LTV for customers segmented into a new consumable prospect customer state and/or an active consumable prospect customer state. The average LTV for customers segmented into a repeat consumable customer state also can be higher than the average LTV for customers segmented into the repeat consumable prospect customer state and customers segmented into the new consumable customer state. As additional examples, the average LTV for customers can be increasing in this order: (example 1) inactive customer state, prospect customer state, active customer state and repeat customer state; (example 2) prospect customer state, inactive customer state, new customer state, active customer state, and repeat customer state; (example 3) prospect customer state, new durable customer state, inactive durable customer state, active durable customer state, new consumable customer state, repeat durable customer state, inactive consumable customer state, active consumable customer state, and repeat consumable customer state; and (example 4) prospect customer state, inactive durable customer state, new durable customer state, active durable customer state, repeat durable customer state, inactive consumable customer state, new consumable customer converted from prospect state, new consumable customer converted from durable customer state, active consumable customer state, repeat consumable customer state.

In some embodiments, method 500 can further comprise an activity of allocating marketing resources to transition the one or more first customers from the first customer state to the second customer state. More particularly, market resources can be allocated to transition customers to the customer state comprising the highest average LTV for customers segmented therein. For example, because the average LTV for customers segmented into a repeat consumable customer state is higher than the average LTV for customers segmented into the repeat consumable prospect customer state and customers segmented into the new consumable customer state, marketing resources can be allocated to transition customers from the repeat consumable prospect customer state or the new consumable customer state to the repeat consumable customer state.

In some embodiments, transition between customer states can be defined as a transition path. For example, an acquisition transition path can be a transition advancement for a customer from (1) a prospect customer state to a new customer state and/or (2) a consumable prospect customer state to a new consumable customer state. A retention transition path can be a transition for a customer from (1) a new customer state to a repeat customer state, (2) an active customer state to a repeat customer state, (3) a new consumable customer state to a repeat consumable customer state, and/or (4) an inactive consumable customer state to an active consumable customer state. A reactivation transition path can be a transition for a customer from (1) an inactive customer state to an active customer state, and/or (2) an active consumable customer state to a repeat consumable customer state. A degradation transition path can be a transition for a customer from (1) a new customer state to an inactive customer state, (2) a repeat customer state to an active customer state, (3) an active customer state to an inactive customer state, (4) a new consumable customer state to an inactive consumable customer state, (5) a repeat consumable customer state to an inactive consumable customer state, (6) a repeat consumable customer state to an active consumable customer state, and/or (7) an active consumable customer state to an inactive consumable customer state.

In some embodiments, allocating marketing resources to transition customers to a customer state having a higher average LTV can comprise allocating marketing resources to email advertisement campaigns, targeted advertisements on social media, search engine marketing, customizing advertisements on an advertisement carousel on the website of the retailer, targeted advertisements on websites not associated or affiliated with the retailer, and the like. In each of these examples, the advertisement can be specifically configured to target users segmented in one customer state and transition the customer to another customer state having a higher average LTV. Thus, the advertisement can be different depending on the customer state for the customer. In some embodiments, system 300 (FIG. 3) can tag or otherwise identify customers after visiting the website of the retailer and record computer identification information (such as cookies) for the customers when the one or more first customers and the one or more second customers visit a website of the retailer.

In some embodiments, a distributed network comprising distributed memory architecture is used to retrieve advertisements and/or retrieve customer information for segmenting of the plurality of customers. This distributed architecture can reduce the impact on the network and system resources to reduce congestion in bottlenecks while still allowing data to be accessible from a central location.

Returning to FIG. 5, method 500 further can comprise an activity 520 of coordinating a first display of a first online advertisement for the one or more first customers to transition the one or more first customers from the first customer state to the second customer state, and also an activity 525 of coordinating a second display of a second online advertisement for the one or more second customers to transition the one or more second customers to a customer state comprising a higher or highest LTV average. Because the advertisements can be targeted based on the customer state to which a customer is segmented, the first online advertisement and the second online advertisement can be different. For example, if the first customer is segmented in a new consumable prospect customer state and if the second customer is segmented in a repeat consumable customer state, the first advertisement for the first customer may be for a consumable product, and the second advertisement for the second customer may be for a durable product.

In more particular embodiments, coordinating the first display of the first online advertisement can comprise coordinating, using the computer identification of the one or more first customers, the first display of the first online advertisement for the one or more first customers on an offsite webpage that is not affiliated with the website of the retailer when the one or more first customers visit the offsite webpage. The offsite webpage can be a third-party social media webpage, a search engine webpage, or other third-party webpage. In these and other embodiments, coordinating the second display of the second online advertisement can comprise coordinating, using the computer identification of the one or more second customers, the second display of the second online advertisement for the one or more second customers on the offsite webpage when the one or more second customers visit the offsite webpage.

In some particular embodiments, coordinating the first display of the first online advertisement can comprise coordinating, using the computer identification of the one or more first customers, the first display of the first online advertisement for the one or more first customers on an advertisement carousel on the website of the retailer when the one or more first customers visit the website of the retailer. In these and other embodiments, coordinating the second display of the second online advertisement can comprise coordinating, using the computer identification of the one or more second customers, the second display of the second online advertisement for the one or more second customers on the advertisement carousel on the website of the retailer when the one or more second customers visit the website of the retailer.

In some embodiments coordinating the first display of the first online advertisement can comprise coordinating the first display of the first online advertisement for the one or more first customers in a first email sent to the one or more first customers. In these and other embodiments, coordinating the second display of the second online advertisement can comprise coordinating the second display of the second online advertisement for the one or more second customers in a second email sent to the one or more second customers.

FIG. 6 illustrates a block diagram of a portion of system 300 comprising LTV system 310, web server 320, display system 360, and/or customer state system 370, according to the embodiment shown in FIG. 3. Each of LTV system 310, web server 320, display system 360, and/or customer state system 370, is merely exemplary and not limited to the embodiments presented herein. Each of LTV system 310, web server 320, display system 360, and/or customer state system 370, can be employed in many different embodiments or examples not specifically depicted or described herein. In some embodiments, certain elements or modules of LTV system 310, web server 320, display system 360, and/or customer state system 370, can perform various procedures, processes, and/or acts. In other embodiments, the procedures, processes, and/or acts can be performed by other suitable elements or modules.

In many embodiments, LTV system 310 can comprise non-transitory memory storage modules 612, 614, 616, and 618. Memory storage module 612 can be referred to as customer information module 612. In many embodiments, customer information module 612 can store computing instructions configured to run on one or more processing modules and perform one or more acts of method 400 (FIGS. 4A-4B) (e.g., activity 405 of storing customer information in a customer database of a retailer (FIG. 4A), and activity 410 of determining whether each customer of the plurality of customers had (1) an online store transaction with the retailer, (2) an offline store transaction with the retailer, or (3) an online interaction with the retailer within a first predetermined period of time (FIG. 4A)).

Memory storage module 614 can be referred to as categorization module 614. In many embodiments, categorization module 614 can store computing instructions configured to run on one or more processing modules and perform one or more acts of method 400 (FIGS. 4A-4B) (e.g. activity 415 of categorizing one or more first customers of the plurality of customers into a first customer group if the one or more first customers had (1) the online store transaction with the retailer, (2) the offline store transaction with the retailer, or (3) the online interaction with the retailer within the first predetermined period of time (FIG. 4A), and activity 420 of categorizing one or more second customers of the plurality of customers into a second customer group if the one or more second customers did not have (1) the online store transaction with the retailer, (2) the offline store transaction with the retailer, or (3) the online interaction with the retailer within the first predetermined period of time (FIG. 4A)).

Memory storage module 616 can be referred to as prediction module 616. In many embodiments, prediction module 616 can store computing instructions configured to run on one or more processing modules and perform one or more acts of method 400 (FIGS. 4A-4B) (e.g. activity 425 of predicting, using a LTV update model, a LTV for each of the one or more first customers of the first customer group (FIG. 4A), which can include activity 426 of predicting a retention probability for each of the one or more first customers using a logistic regression (FIG. 4B), activity 427 of determining if the retention probability for each of the one or more first customers is greater than a predetermined threshold value (FIG. 4B), activity 428 of predicting (1) a GMV value and (2) a number of orders for each of the one or more first customers using a random forest model if the retention probability for each of the one or more first customers is greater than the predetermined threshold, and activity 429 of predicting (1) a zero GMV value and (2) zero orders for any of the one or more first customers if the retention probability for the any of the one more first customers is not greater than the predetermined threshold (FIG. 4B), and activity 430 of predicting, using one or more LTV decay functions, the LTV for each of the one or more second customers of the second customer group (FIG. 4A)).

Memory storage module 618 can be referred to as advertisement module 618. In many embodiments, advertisement module 618 can store computing instructions configured to run on one or more processing modules and perform one or more acts of method 400 (FIGS. 4A-4B) (e.g. activity 435 of determining an online advertisement for each customer of the plurality of customers based on the LTV as predicted for each customer of the plurality of customers (FIG. 4A)).

In many embodiments, one or more non-transitory memory storage modules 612, 614, 616, and 618 of LTV system 310 can store computing instruction configured to run on one or more processing modules and perform one or more acts of method 500 (FIG. 5) (e.g. activity 505 of determining, for each customer of a plurality of customers, a LTV for a retailer (FIG. 5)).

In many embodiments, customer state system 370 can comprise non-transitory memory storage module 672. Memory storage module 672 can be referred to as segmenting module 672. In many embodiments, segmenting module 672 can store computing instructions configured to run on one or more processing modules and perform one or more acts of method 500 (FIG. 5) (e.g., activity 510 of segmenting the plurality of customers into a plurality of customer states based upon one or more purchases made by each customer of the plurality of customers at the retailer within a predetermined period of time (FIG. 5), and activity 515 of determining a first average LTV for the one or more first customers and a second average LTV for the one or more second customers (FIG. 5)).

In many embodiments, display system 360 can comprise non-transitory memory storage module 662. Memory storage module 662 can be referred to as display module 662. In many embodiments, display module 662 can store computing instructions configured to run on one or more processing modules and perform one or more acts of methods 400 and 500 (FIGS. 4A, 4B, and 5) (e.g., activity 440 of coordinating a display of the online advertisement for at least a portion of the plurality of customers (FIG. 4A), activity 520 of coordinating a first display of a first online advertisement for the one or more first customers to transition the one or more first customers from the first customer state to the second customer state (FIG. 5), and activity 525 of coordinating a second display of a second online advertisement for the one or more second customers (FIG. 5)).

Although systems and methods for determining customer LTV and customer state transitions for growth of customer LTV have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4A-B and 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
   determining, for each respective customer of a plurality of customers, a respective lifetime value (LTV) for a retailer using a two-stage machine learning LTV prediction algorithm;
   segmenting each respective customer into one or more customer states based upon one or more respective purchases made by each respective customer of the plurality of customers at the retailer within a predetermined period of time such that:
      one or more first customers of the plurality of customers are segmented into a first customer state of the one or more customer states; and
      one or more second customers of the plurality of customers are segmented into a second customer state of the one or more customer states;
   determining a first average LTV for the one or more first customers and a second average LTV for the one or more second customers, wherein the first average LTV is a lower number than the second average LTV;
coordinating displaying a first online advertisement for the one or more first customers on an offsite advertisement carousel displayed on an offsite webpage that is not affiliated with a website of the retailer, the first online advertisement configured to transition the one or more first customers from the first customer state to the second customer state; and
coordinating displaying a second online advertisement for the one or more second customers.

2. The system of claim 1, wherein the one or more non-transitory storage devices storing the computing instructions are further configured to run on the one or more processors and perform:
allocating marketing resources to transition the one or more first customers from the first customer state to the second customer state.

3. The system of claim 1, wherein the one or more non-transitory storage devices storing the computing instructions are further configured to run on the one or more processors and perform:
recording computer identification information for the one or more first customers and the one or more second customers when the one or more first customers and the one or more second customers visit the website of the retailer.

4. The system of claim 3, wherein:
coordinating displaying the first online advertisement comprises:
coordinating displaying, using the computer identification information for the one or more first customers, the first online advertisement for the one or more first customers on the offsite advertisement carousel displayed on the offsite webpage that is not affiliated with the website of the retailer when the one or more first customers visit the offsite webpage; and
coordinating displaying the second online advertisement comprises:
coordinating displaying, using the computer identification information for the one or more second customers, the second online advertisement for the one or more second customers on the offsite advertisement carousel displayed on the offsite webpage when the one or more second customers visit the offsite webpage.

5. The system of claim 3, wherein:
coordinating displaying the first online advertisement comprises:
coordinating displaying, using the computer identification information for the one or more first customers, the first online advertisement for the one or more first customers on an onsite advertisement carousel on the website of the retailer when the one or more first customers visit the website of the retailer; and
coordinating displaying the second online advertisement comprises:
coordinating displaying, using the computer identification information for the one or more second customers, the second online advertisement for the one or more second customers on the onsite advertisement carousel on the website of the retailer when the one or more second customers visit the website of the retailer.

6. The system of claim 1, wherein:
coordinating displaying the first online advertisement comprises:
coordinating displaying the first online advertisement for the one or more first customers in a first email sent to the one or more first customers; and
coordinating displaying the second online advertisement comprises:
coordinating displaying the second online advertisement for the one or more second customers in a second email sent to the one or more second customers.

7. The system of claim 1, wherein:
the one or more customer states comprise:
a prospect customer state, wherein a respective customer of the plurality of customers has made no purchases with the retailer;
a new customer state, wherein a respective customer of the plurality of customers has made one purchase with the retailer within the predetermined period of time and no purchases with the retailer before the predetermined period of time;
a repeat customer state, wherein a respective customer of the plurality of customers has made two or more purchases with the retailer within the predetermined period of time;
an inactive customer state, wherein a respective customer of the plurality of customers has made no purchases with the retailer within the predetermined period of time and one or more purchases with the retailer before the predetermined period of time; and
an active customer state, wherein a respective customer of the plurality of customers has made one purchase with the retailer within the predetermined period of time and one or more purchases with the retailer before the predetermined period of time;
the first customer state comprises at least one of the prospect customer state, the new customer state, or the inactive customer state; and
the second customer state comprises at least one of the repeat customer state or the active customer state.

8. The system of claim 1, wherein:
the one or more customer states comprise:
a consumable prospect customer state, wherein a respective customer of the plurality of customers has made no consumable product purchases with the retailer;
a new consumable customer state, wherein a respective customer of the plurality of customers has made one consumable product purchase with the retailer within the predetermined period of time and no consumable product purchases with the retailer before the predetermined period of time;
a repeat consumable customer state, wherein a respective customer of the plurality of customers has made two or more consumable product purchases with the retailer within the predetermined period of time;
an inactive consumable customer state, wherein a respective customer of the plurality of customers has made no consumable product purchases with the retailer within the predetermined period of time and one or more consumable product purchases with the retailer before the predetermined period of time; and
an active consumable customer state wherein, a respective customer of the plurality of customers has made one consumable product purchase with the retailer within the predetermined period of time and one or more consumable product purchases with the retailer before the predetermined period of time;

the first customer state comprises at least one of the consumable prospect customer state, the new consumable customer state, or the inactive consumable customer state; and the second customer state comprises at least one of the repeat consumable customer state or the active consumable customer state.

9. The system of claim 1, wherein:
the one or more customer states comprise:
  a durable prospect customer state, wherein a respective customer of the plurality of customers has made no durable product purchases with the retailer;
  a new durable prospect customer state, wherein a respective customer of the plurality of customers has made one durable product purchase with the retailer within the predetermined period of time and no durable product purchases with the retailer before the predetermined period of time;
  a repeat durable prospect customer state, wherein a respective customer of the plurality of customers has made two or more durable product purchases with the retailer within the predetermined period of time;
  an inactive durable prospect customer state, wherein a respective customer of the plurality of customers has made no durable product purchases with the retailer within the predetermined period of time and one or more durable product purchases with the retailer before the predetermined period of time; and
  an active durable prospect customer state, wherein a respective customer of the plurality of customers has made one durable product purchase with the retailer within the predetermined period of time and one or more durable product purchases with the retailer before the predetermined period of time;
  the first customer state comprises at least one of the durable prospect customer state, the new durable prospect customer state, or the inactive durable prospect customer state; and
  the second customer state comprises at least one of the repeat durable prospect customer state or the active durable prospect customer state.

10. A method comprising:
determining, for each respective customer of a plurality of customers, a respective lifetime value (LTV) for a retailer using a two-stage machine learning LTV prediction algorithm;
segmenting each respective customer into one or more customer states based upon one or more respective purchases made by each respective customer of the plurality of customers at the retailer within a predetermined period of time such that:
  one or more first customers of the plurality of customers are segmented into a first customer state of the one or more customer states; and
  one or more second customers of the plurality of customers are segmented into a second customer state of the one or more customer states;
determining a first average LTV for the one or more first customers and a second average LTV for the one or more second customers, wherein the first average LTV is a lower number than the second average LTV;
coordinating displaying a first online advertisement for the one or more first customers on an offsite advertisement carousel displayed on an offsite webpage that is not affiliated with a website of the retailer, the first online advertisement configured to transition the one or more first customers from the first customer state to the second customer state; and
coordinating displaying a second online advertisement for the one or more second customers.

11. The method of claim 10, further comprising allocating marketing resources to transition the one or more first customers from the first customer state to the second customer state.

12. The method of claim 10, further comprising recording computer identification information for the one or more first customers and the one or more second customers when the one or more first customers and the one or more second customers visit the website of the retailer.

13. The method of claim 12, wherein:
coordinating displaying the first online advertisement on the advertisement carousel comprises:
  coordinating displaying, using the computer identification information for the one or more first customers, the first online advertisement for the one or more first customers on the offsite advertisement carousel displayed on the offsite webpage that is not affiliated with the website of the retailer when the one or more first customers visit the offsite webpage; and
coordinating displaying the second online advertisement comprises:
  coordinating displaying, using the computer identification information for the one or more second customers, the second online advertisement for the one or more second customers on the offsite advertisement carousel displayed on the offsite webpage when the one or more second customers visit the offsite webpage.

14. The method of claim 12, wherein:
coordinating displaying the first online advertisement comprises:
  coordinating displaying, using the computer identification information for the one or more first customers, the first online advertisement for the one or more first customers on an onsite advertisement carousel on the website of the retailer when the one or more first customers visit the website of the retailer; and
coordinating displaying the second online advertisement comprises:
  coordinating displaying, using the computer identification information for the one or more second customers, the second online advertisement for the one or more second customers on the onsite advertisement carousel on the website of the retailer when the one or more second customers visit the website of the retailer.

15. The method of claim 10, wherein:
coordinating displaying the first online advertisement comprises:
  coordinating displaying the first online advertisement for the one or more first customers in a first email sent to the one or more first customers; and
coordinating displaying the second online advertisement comprises:
  coordinating displaying the second online advertisement for the one or more second customers in a second email sent to the one or more second customers.

16. The method of claim 10, wherein:
the one or more customer states comprise:
  a prospect customer state, wherein a respective customer of the plurality of customers has made no purchases with the retailer;

a new customer state, wherein a respective customer of the plurality of customers has made one purchase with the retailer within the predetermined period of time and no purchases with the retailer before the predetermined period of time;

a repeat customer state, wherein a respective customer of the plurality of customers has made two or more purchases with the retailer within the predetermined period of time;

an inactive customer state, wherein a respective customer of the plurality of customers has made no purchases with the retailer within the predetermined period of time and one or more purchases with the retailer before the predetermined period of time; and an active customer state, wherein a respective customer of the plurality of customers has made one purchase with the retailer within the predetermined period of time and one or more purchases with the retailer before the predetermined period of time;

the first customer state comprises at least one of the prospect customer state, the new customer state, or the inactive customer state; and the second customer state comprises at least one of the repeat customer state or the active customer state.

17. The method of claim 10, wherein:

the one or more customer states comprise:

a consumable prospect customer state, wherein a respective customer of the plurality of customers has made no consumable product purchases with the retailer;

a new consumable customer state, wherein a respective customer of the plurality of customers has made one consumable product purchase with the retailer within the predetermined period of time and no consumable product purchases with the retailer before the predetermined period of time;

a repeat consumable customer state, wherein a respective customer of the plurality of customers has made two or more consumable product purchases with the retailer within the predetermined period of time;

an inactive consumable customer state, wherein a respective customer of the plurality of customers has made no consumable product purchases with the retailer within the predetermined period of time and one or more consumable product purchases with the retailer before the predetermined period of time; and an active consumable customer state, wherein a respective customer of the plurality of customers has made one consumable product purchase with the retailer within the predetermined period of time and one or more consumable product purchases with the retailer before the predetermined period of time;

the first customer state comprises at least one of the consumable prospect customer state, the new consumable customer state, or the inactive consumable customer state; and the second customer state comprises at least one of the repeat consumable customer state or the active consumable customer state.

18. The method of claim 10, wherein:

the one or more customer states comprise:

a durable prospect customer state, wherein a respective customer of the plurality of customers has made no durable product purchases with the retailer;

a new durable prospect customer state, wherein a respective customer of the plurality of customers has made one durable product purchase with the retailer within the predetermined period of time and no durable product purchases with the retailer before the predetermined period of time;

a repeat durable prospect customer state, wherein a respective customer of the plurality of customers has made two or more durable product purchases with the retailer within the predetermined period of time;

an inactive durable prospect customer state, wherein a respective customer of the plurality of customers has made no durable product purchases with the retailer within the predetermined period of time and one or more durable product purchases with the retailer before the predetermined period of time; and an active durable prospect customer state, wherein a respective customer of the plurality of customers has made one durable product purchase with the retailer within the predetermined period of time and one or more durable product purchases with the retailer before the predetermined period of time;

the first customer state comprises at least one of the durable prospect customer state, the new durable prospect customer state, or the inactive durable prospect customer state; and the second customer state comprises at least one of the repeat durable prospect customer state or the active durable prospect customer state.

* * * * *